United States Patent [19]
Rostoker et al.

[11] Patent Number: 5,678,057
[45] Date of Patent: Oct. 14, 1997

[54] MULTI-CHIP-MODULE (MCM) MICROCIRCUIT INCLUDING MULTIPLE PROCESSORS AND ADVANCED PROGRAMMABLE INTERRUPT CONTROLLER (APIC)

[75] Inventors: Michael D. Rostoker, Boulder Creek, Calif.; Sushant Verman, Mississauga, Canada; Richard Egan, San Carlos; Jerry Erh Hsiung Chow, Sunnyvale, both of Calif.

[73] Assignee: LSI Logic Corporation, Milpitas, Calif.

[21] Appl. No.: 485,865

[22] Filed: Jun. 7, 1995

[51] Int. Cl.⁶ .................................................. G06F 13/14
[52] U.S. Cl. .................... 395/800; 395/868; 364/229; 364/230.2; 364/238.3; 364/DIG. 1
[58] Field of Search ........................... 395/800, 868, 395/742; 361/744, 748; 364/229, 230.2, 238.3, DIG. 1

[56] References Cited

U.S. PATENT DOCUMENTS

| | | | |
|---|---|---|---|
| 5,241,450 | 8/1993 | Bernhardt et al. | 455/182.3 |
| 5,475,262 | 12/1995 | Wang et al. | 257/698 |
| 5,481,725 | 1/1996 | Jayakumar et al. | 395/868 |
| 5,511,200 | 4/1996 | Jayakumar | 395/739 |
| 5,579,512 | 11/1996 | Goodrum et al. | 395/500 |

*Primary Examiner*—Alyssa H. Bowler
*Assistant Examiner*—John Harrity
*Attorney, Agent, or Firm*—Oppenheimer Poms Smith

[57] ABSTRACT

A Multi-Chip-Module (MCM) microcircuit comprises a substrate, a plurality of integrated circuit processors mounted on the substrate, and an Advanced Programmable Interrupt Controller (APIC) system for distributing interrupts to the processors. The APIC system comprises a plurality of local units for prioritizing and passing interrupts to the processors respectively, and an Input/Output (I/O) unit for feeding interrupts to processors to which the interrupts are addressed. Electrical conductor patterns are formed on and between dielectric layers of the substrate for interconnecting the processors, the local units and the I/O unit.

25 Claims, 3 Drawing Sheets

1
MULTI-CHIP-MODULE (MCM) MICROCIRCUIT INCLUDING MULTIPLE PROCESSORS AND ADVANCED PROGRAMMABLE INTERRUPT CONTROLLER (APIC)

BACKGROUND OF THE INVENTION

1. Field of the Invention

The present invention generally relates to the art of very large integrated circuits, and more specifically to a Multi-Chip-Module (MCM) microcircuit including multiple processors and an Advanced Programmable Interrupt Controller (APIC).

2. Description of the Related Art

Hybrid or MCM modules provide reduced size and increased system level performance. An MCM includes a substrate on which one or more integrated microcircuit chips are mounted. The substrate has a multilevel structure including alternating patterned metal conductor and dielectric layers.

The conductor layers are formed as by thin film screen printing, sputtering or plating, or other suitable means, and are patterned as lines and planes to provide power and signal interconnections between chips. Vertical interconnects (vias) are formed through the dielectric or insulating layers to appropriately interconnect adjacent conductor layers. The dielectric layers are typically formed by deposition of polyimide, ceramic or the like.

A problem which has remained in the art regarding the development of MCMs, especially those including a large number of processors or other logic functions, which preferably operate in parallel in a coordinated manner, is the efficient distribution and processing of interrupts generated by a system controller or received from an external interrupt signal bus, to the individual processors.

An interrupt is a signal which causes a processor to suspend its current operation in an orderly manner, and initiate another operation designated by an associated interrupt vector which constitutes a starting address for stored program code which controls the processor to perform the operation designated by the interrupt vector.

If several processors are capable of servicing an interrupt, and no specific processor is designated, some method of assigning a processor to service the interrupt is required. Typically, an auxiliary processor is provided for the sole purpose of processing, prioritizing and distributing interrupts, thereby introducing delays into the overall operation of the system. If the interrupts cannot be processed fast enough, data overrun, data loss, and/or other system malfunction(s) can occur.

SUMMARY OF THE INVENTION

A Multi-Chip-Module (MCM) microcircuit according to the present invention comprises a substrate, a plurality of integrated circuit processors mounted on the substrate, and an Advanced Programmable Interrupt Controller (APIC) system for distributing interrupts to the processors.

A processor within the scope of the invention can be an integrated circuit die or section of a die, including or embodying a complex logic function, i.e. a microprocessor or microcontroller.

An MCM can include a die on die flip-chip. Also contemplated is two processors on one die which are "bridged" or connected by a second die. The APIC system can be provided on one or both of the dies.

The APIC system comprises a plurality of local units for prioritizing and passing interrupts to the processors respectively, and an Input/Output (I/O) unit for feeding interrupts to processors to which the interrupts are addressed. Electrical conductors are formed on and between dielectric layers of the substrate for interconnecting the processors, the local units and the I/O unit.

The term "semiconductor device assembly" or "integrated circuit assembly" may also refer to the silicon die and associated leadframe such as a tape carrier or package-less silicon die on a leadframe which may be encapsulated or not. The leadframe is connected to the package-less silicon die as is well known to those skilled in the art of semiconductor devices.

Since the APIC system processes interrupts in parallel with the data processing operations, data overrun, data loss, and/or other similar system malfunction will not occur. Interrupts are prioritized and distributed in a highly efficient manner compared to the prior art.

The system cost is reduced through lower chip count, and the chip cost is reduced due to lower pin count. The APIC local units can interface directly to industry standard processors such that standard operation system software can be used with minimal modification.

In addition, power consumption is reduced due to a higher level of circuit integration, and the APIC interrupt bus can be scaled up to service more processors without modification.

These and other features and advantages of the present invention will be apparent to those skilled in the art from the following detailed description, taken together with the accompanying drawings, in which like reference numerals refer to like parts.

DESCRIPTION OF THE DRAWINGS

FIG. 5b is a plan view of the MCM arrangement of FIG. 5a.

DETAILED DESCRIPTION OF THE INVENTION

A system level device according to the present invention may specifically include Single-Chip-Modules (SCM), often including other electrical components (such as capacitors); Multi-Chip-Modules (MCM) having 2 or more integrated circuits with or without other electrical components; and board level products (BLP), such as those having multiple integrated circuits on a resin printed circuit or substrate board.

The invention further includes box level products ("Boxes"), which may include a combination of elements from the list of SCM, MCM, BLP, or other devices, and may also include a power supply.

Such system level devices specifically contemplated include digital (or other) memory storage systems, security systems, general purpose computers (such as personal computers, work stations, servers, mini computers, mainframe computers and super computers), transportation vehicles (such as airplanes, trains, automobiles, helicopters, rockets, missiles, boats, and submarines.

The contemplated system level devices further include subsystems for such vehicles, such as positioning (i.e. Global Positioning Systems (GPS)), display controllers, navigation, etc., entertainment systems (such as digital or other television, cameras, recorders, compact disc players/recorders, FM, AM, tape or other audio systems), communication systems such as "traditional" or cellular telephones, PBX, telephone switches, network controllers or encoder/decoders (i.e. token ring, Ethernet, etc.).

The contemplated devices yet further include subsystems or subassemblies for inclusion or attachment to such more complex system level products.

Figure 1:
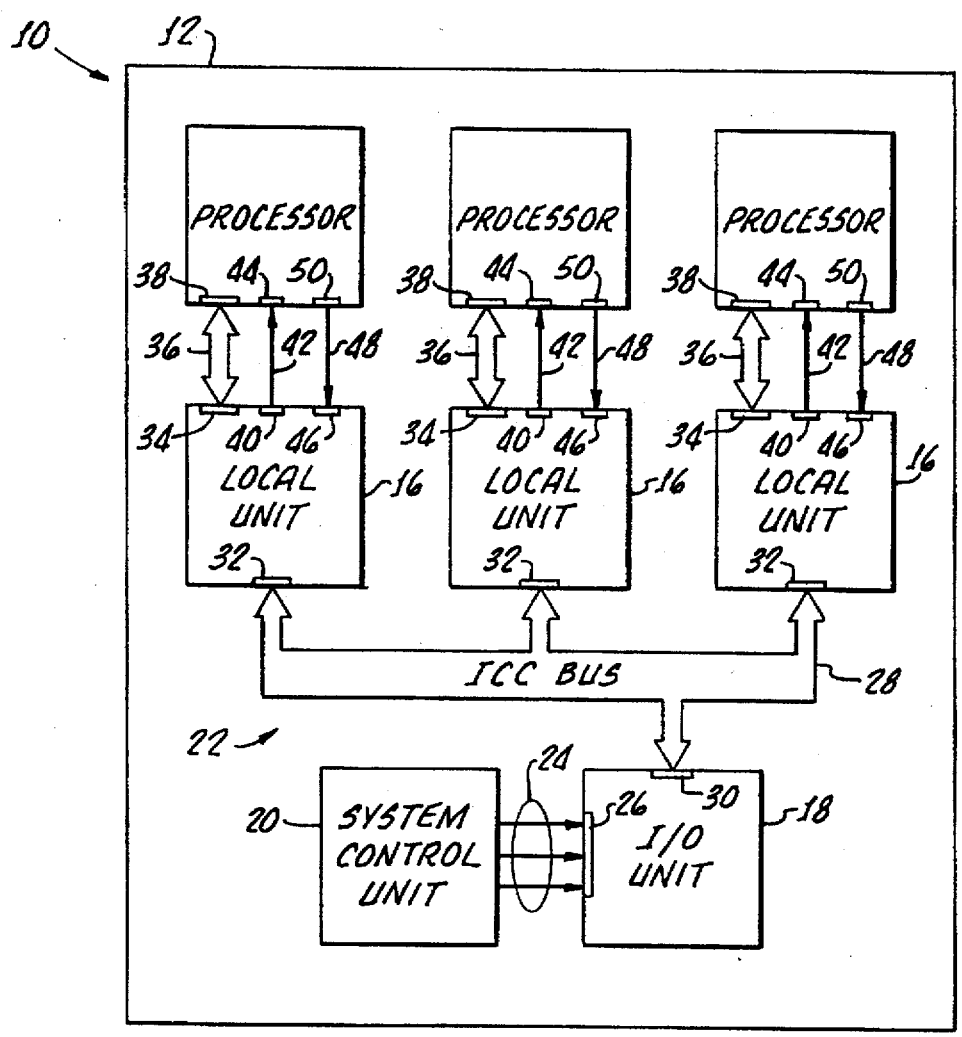
FIG. 1 is a diagram illustrating a Multi-Chip-Module (MCM) microcircuit according to the present invention.
Figure 2:
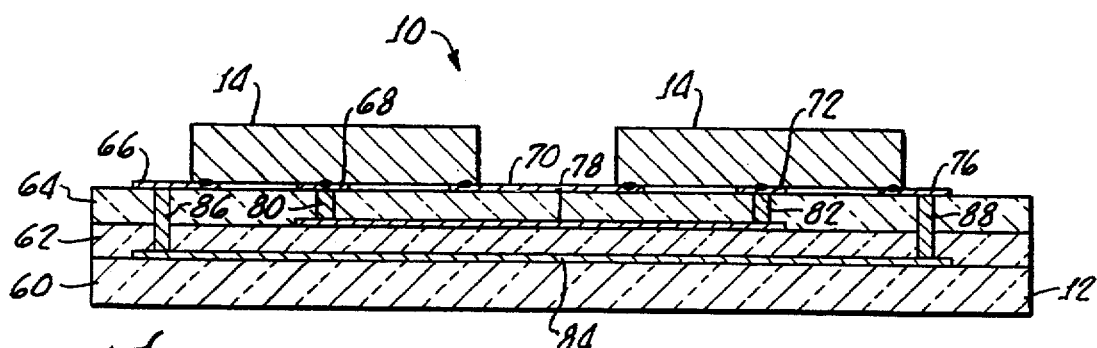
FIG. 2 is a sectional view illustrating a representative cross-section of the microcircuit.

A device in the form of a Multi-Chip-Module (MCM) microcircuit 10 according to the present invention is illustrated in FIG. 1. A cross-section of a representative portion of the microcircuit 10 is illustrated in FIG. 2.

The microcircuit 10 comprises a substrate structure 12 including at least one dielectric (herein referring to any appropriate dielectric, insulating or similar layer which is not conductive in normal operation) layer and at least one conductor pattern layer as will be described in detail below. A plurality of terminals for integrated circuit chip microprocessors or other devices are formed on the structure 12. The terminals generally include conductive pads for interconnection with conjugate terminals on the processor chips.

The interconnections can be made by wire bonds, Tape Automated Bonding (TAB) or the like in a configuration in which the processor chips are mounted on the structure 12 with their terminals facing away from the structure 12, or by conductive bumps in a configuration known as "flip-chip" in which the processor chips are mounted with their terminals facing the structure.

As illustrated in FIG. 1, three integrated circuit chip processors 14, three Advanced Programmable Interrupt Controller (APIC) local units 16, an APIC I/O unit 18, and optionally a system control unit 20 are mounted on the structure 12. The processors 14 can be conventional microprocessors, or any type of integrated circuit devices which are capable of servicing interrupt signals. The processors 14 can be identical, or can be different.

The APIC local units 16 and I/O unit 18 constitute an APIC system 22 which efficiently distributes and prioritizes interrupts to the processors 14. In the illustrated arrangement, interrupt signals are generated by the system control unit 20. However, the invention is not so limited, and further encompasses an arrangement in which no system control unit is provided on the structure 12, and the interrupt signals are received from one or more external sources.

The I/O unit 18 is connected to the system control unit 20 (or other interrupt signal source) by interrupt lines 24 via terminals 26. There are typically 16 interrupt lines 24 which can be connected to the I/O unit 18 as shown, or to different interrupt signal sources in any combination.

The I/O unit 18 receives and distributes interrupt signals from the unit 20 or other source over a ICC bus 28 via terminals 30 to the local units 16. Typically, the ICC bus 28 is a five wire synchronous bus consisting of four wires that are used for data transmission and arbitration, and one wire that is used to transmit clock signals, and is connected to the local units 16 via terminals 32.

Each local unit 16 is connected through terminals 34, a data/address bus 36 and terminals 38 to a respective processor 14. The local units 16 and processors 14 are further interconnected by terminals 40, an interrupt line 42 by which the local units 16 can interrupt the processors 14, and terminals 44. The local units 16 and processors 14 are yet further interconnected by terminals 46, an interrupt line 48 by which the processors 14 can interrupt the local units 16, and terminals 50.

An APIC system can be combined with a plurality of processors 14 and the substrate structure 12 to implement the present microcircuit 10. For example, an ADVANCED PROGRAMMABLE INTERRUPT CONTROLLER 82489DX is commercially available from Intel which includes an I/O unit and a local unit on a single chip.

The microcircuit 10 can be implemented using the I/O unit in one 82489DX chip, the local unit in the same chip, and the local units in two other 82489DX chips in combination with the substrate structure 12 and three processors 14 which are interconnected as illustrated.

The terminals, signal lines and busses which have been described above and illustrated in FIG. 1 are formed on or between dielectric layers of the substrate structure 12. The scope of the invention further encompasses a module including only the substrate structure 12, the APIC system 22, the terminals, and the conducting lines and busses, by which a customer can mount processors or other microelectronic devices of his choice on the terminals to provide a desired functionality.

FIG. 2 illustrates the general configuration of the microcircuit 10, including the substrate structure 12, two processors 14 and several representative electrical terminal and conductor patterns. The structure 12 is shown as comprising three dielectric layers 60, 62 and 64, although the invention can be practiced using a substrate structure including only one or any other number of such dielectric layers. The layers 60, 62 and 64 can be formed of polyimide or any other suitable dielectric material or ceramic or other insulating material, or silicon for flip-chip MCMs where one die acts as the substrate.

The processors 14 are mounted on and electrically connected to the structure 12 by terminals 66, 68, 70, 72 and 76 which are formed on the surface of the structure 12. The processors 14 are illustrated as being mounted in a flip-chip arrangement, with terminals (not designated) on the processors 14 facing and being ohmically connected to the terminals 66 to 76 by electrically conductive bumps made of solder, indium or other material.

Although not explicitly illustrated, the processors 14 can also be mounted with their terminals facing away from the structure 12, and connected to the terminals 66 to 76 by wire bonds or the like.

The conductor 70 is shown as interconnecting terminals of the two processors 14 on the surface of the structure 12. A conductor 78 is part of a conductor pattern which is formed between the layers 62 and 64. The conductor 78 is connected to the terminals 68 and 72 by electrically conductive vertical interconnects (vias) 80 and 82 which extend through holes in the layer 64.

In a similar manner, a conductor 84 is part of a conductor pattern which is formed between the layers 60 and 62. The conductor 84 is connected to the terminals 66 and 76 by vias 86 and 88 which extend through holes in the layers 62 and 64.

Figure 3:
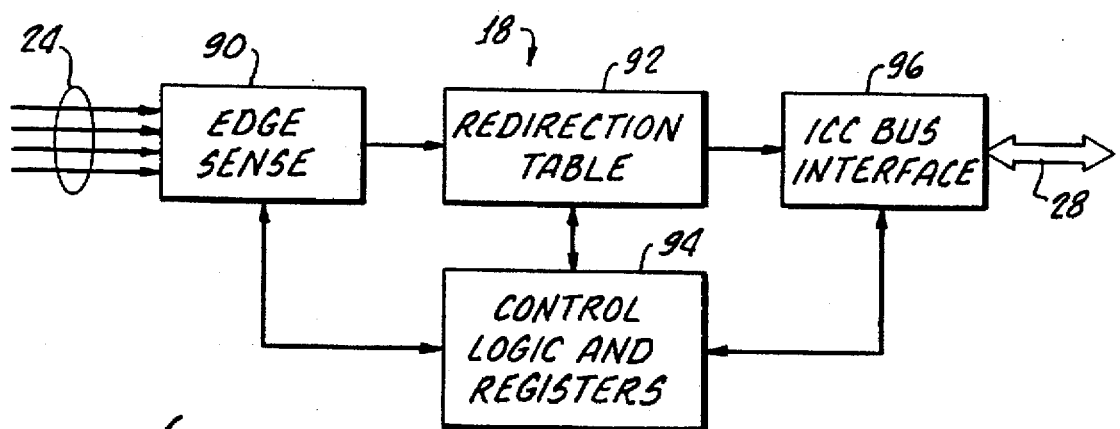
FIG. 3 is a block diagram illustrating the main functional units of an Input/Output (I/O) unit of an Advanced Programmable Interrupt Controller (APIC) system of the microcircuit.

The I/O unit 18 of the APIC system 22 is illustrated in FIG. 3. The unit 18 comprises an edge sense unit 90 which senses interrupts applied to the interrupt lines 24 in the form of an edge or a level. The unit 18 further comprises a redirection table 92 for the interrupts applied to the lines 24. Each entry in the redirection table 92 can be individually programmed to indicate which vector and also what priority the interrupt has, and which of the processors 14 should service the interrupt. For the purposes of the present disclosure, a "table" is defined as any logic or implementation which provides the function of a table.

The logic circuitry and storage registers for implementing the functionality of the I/O unit 18 are collectively designated as a control logic and register unit 94. The unit 94 selects the entry in the redirection table 92 corresponding to a received interrupt and uses the information in the entry to format an interrupt request message. An interface unit 96 broadcasts the message to all of the local units 16 via the ICC bus 28.

Figure 4:
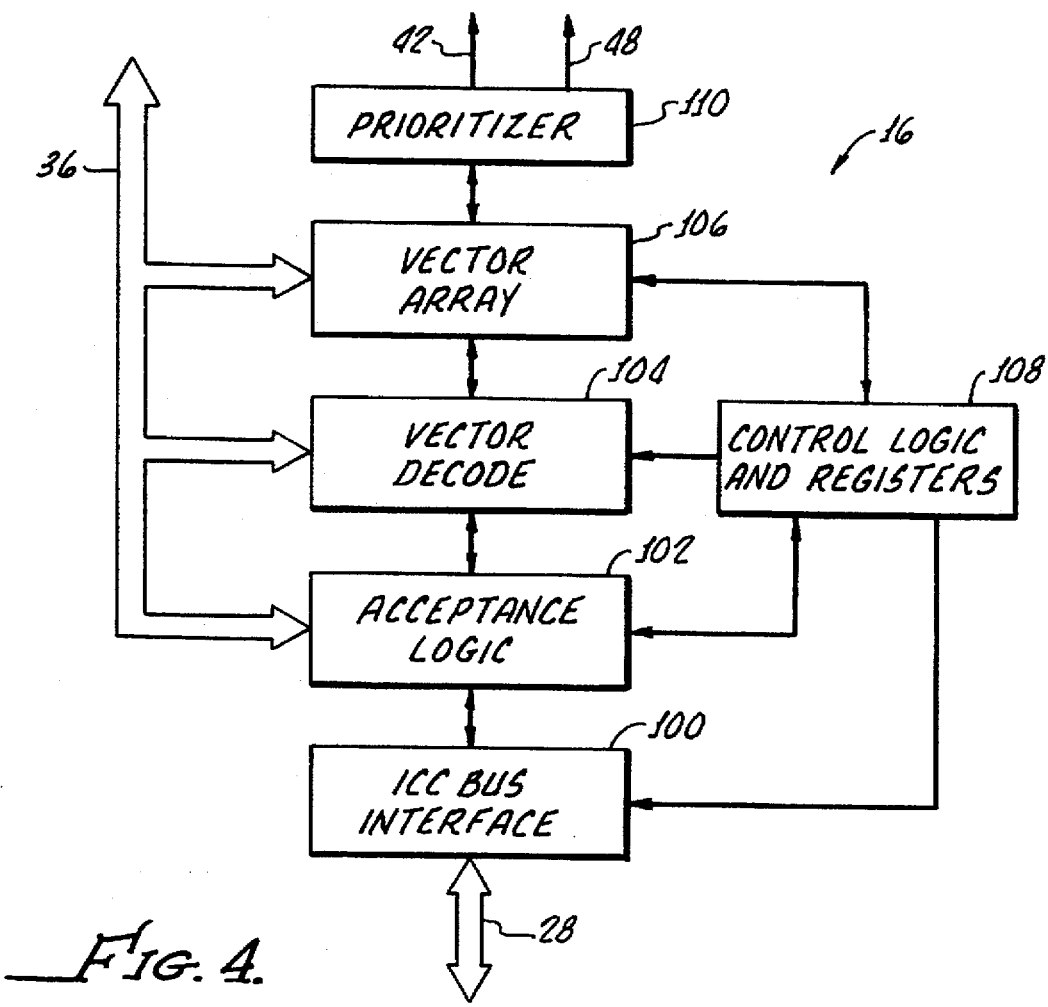
FIG. 4 is a block diagram illustrating the main functional units of a local unit of the APIC system.

Each local unit 16 as illustrated in FIG. 4 has the necessary logical functionality for determining whether or not the respective processor 14 should accept interrupt messages sent on the ICC bus 28 from the I/O unit 18 and/or other local units 16. The local unit 16 also provides local pending of interrupts, nesting and masking of interrupts, and handles all transactions with the respective processor 14.

Interrupt request messages received from the ICC bus 28 via an ICC bus interface 100 are applied to an acceptance logic unit 102. Each interrupt message includes a vector indicating to which processor 14 the interrupt is addressed. It will be noted that a particular interrupt can be serviced by more than one processor 14 on a prioritized basis, and that a particular vector can designate more than one processor 14.

A vector decode unit 104 decodes the vector in the interrupt message by referring to a vector array 106. Under control of a control logic and register unit 108, the local unit 16 determines whether or not the interrupt is addressed to the respective processor 14 and, if so, prioritizes the interrupt message and applies an interrupt to the respective processor 14 via a prioritizer unit 110 and the interrupt line 42.

The local unit 16 also applies an associated interrupt vector to the processor 14 over the data/address bus 36. This vector constitutes a starting address for stored program code which controls the processor 14 to perform the operation designated by the interrupt vector. In response to the interrupt on the line 42, the processor 14 suspends its current operation in a timely manner and services the interrupt.

Figure 5A:
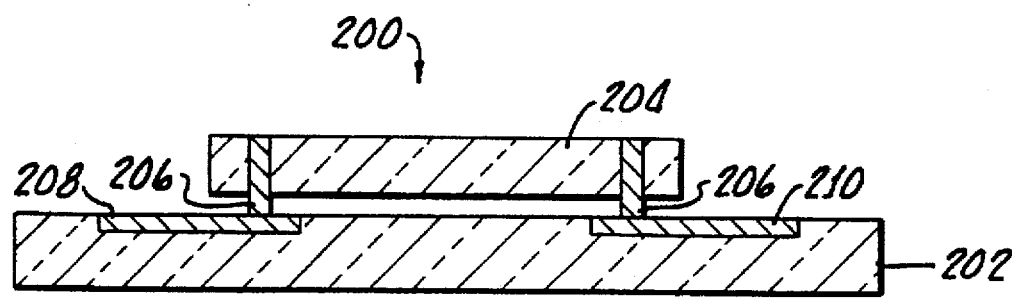
FIG. 5a is a simplified sectional view of an alternative MCM arrangement within the scope of the invention.
Figure 5B:
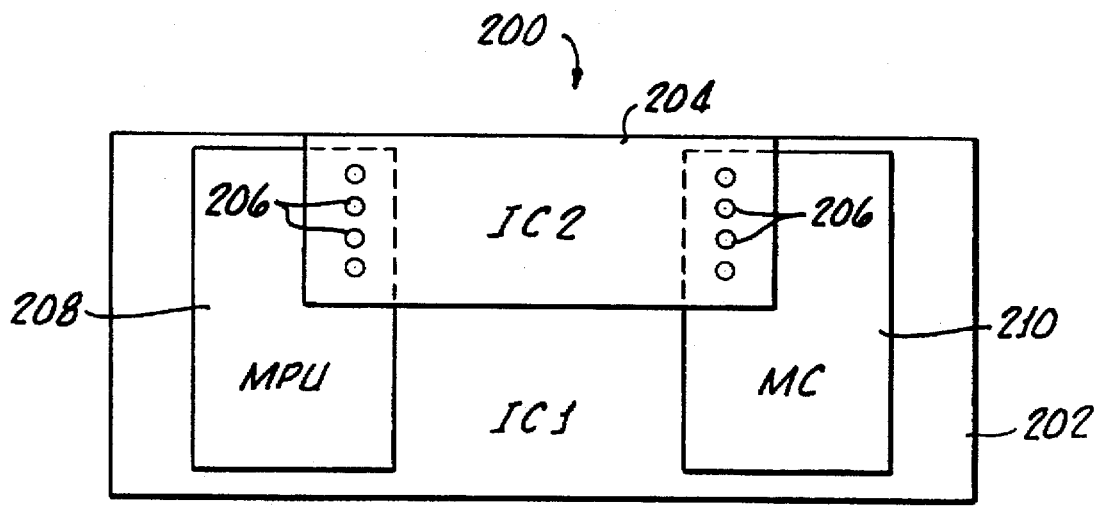

FIGS. 5a and 5b illustrate an alternative embodiment of the present invention. A first integrated circuit die (IC1) 202 constitutes a substrate, and a second integrated circuit die (IC2) 204 is flip-chip mounted on the die 202 by means of solder bumps 206 or the like.

A first processor 208, for example a microprocessor unit (MPU) and a second processor 210, for example a microcontroller (MC) are formed on the die 202 is spaced relation. It will be noted that the processors 208 and 210 can be formed inside the die 202, and that the processors 208 and 210 can be generically considered to be "carried" by the die 202.

The die 204 is configured to interconnect the processors 208 by means of circuitry formed on or in the body of the die 204. An APIC system can be provided for either or both of the processors 208 and 210, although not explicitly illustrated.

Since the APIC system processes interrupts in parallel with the data processing operations, data overrun, data loss, and/or system malfunction will not occur. Interrupts are prioritized and distributed in a highly efficient manner compared to the prior art.

The system cost is reduced through lower chip count, and the chip cost is reduced due to lower pin count. The APIC local units can interface directly to industry standard processors such that standard operation system software can be used with minimal modification.

In addition, power consumption is reduced due to a higher level of circuit integration, and the APIC interrupt bus can be scaled up to provide more processors in the system without modification.

Various modifications will become possible for those skilled in the art after receiving the teachings of the present disclosure without departing from the scope thereof.

We claim:

1. A microcircuit, comprising:

a substrate having at least one dielectric layer, at least one conductor pattern layer, and a plurality of electrical terminals having conductive pads for effecting electrical interconnection on said substrate;

a plurality of microprocessors carried on said substrate for servicing interrupts, individual ones of said plurality of microprocessors having a plurality of conjugate terminals facing toward said substrate and other individual ones of said plurality of microprocessors having a plurality of other conjugate terminals facing away from said substrate for effecting electrical connections between the conjugate terminals and said plurality of conductive pads;

a plurality of Advanced Programmable Interrupt Controller (APIC) local units carried on said substrate for prioritizing and distributing interrupts to individual ones of said plurality of microprocessors selectively;

said plurality of microprocessors and said plurality of APIC local units having a one to one corresponding relationship for effecting the rapid processing of interrupt signals;

an Advanced Programmable Interrupt Controller (APIC) Input/Output (I/O) unit for receiving and distributing interrupt signals to and from said APIC local units;

a five conductor synchronous bus for passing data transmission, clock and arbitration signals between said plurality of APIC local units and said APIC I/O unit;

a plurality of non-multiplexed processor/local unit electrical conductor arrangements for passing data, address and interrupt information signals between individual ones said plurality of APIC local units and corresponding individual ones of said microprocessors;

wherein certain individual ones of said plurality of electrical terminals are coupled to individual ones of said plurality of microprocessors, said APIC local units and said APIC I/O unit for helping to effect on chip electrical interconnections between said plurality of microprocessors, said plurality of APIC local units and said APIC I/O unit;

a plurality of electrical conductors for electrically interconnecting on said substrate, said synchronous bus to individual ones of said plurality of electrical terminals coupled to said APIC local units and the electrical terminals couple to said APIC I/O unit; and a plurality of other electrical conductors for electrically interconnecting individual ones of said plurality of electrical terminals coupled to said plurality of microprocessor and the individual ones of said plurality of electrical terminals couple to said plurality of APIC local units;

said terminals, said synchronous bus, said plurality of processor/local unit electrical conductor arrangements and said plurality of electrical conductors being formed on said substrate and between said at least one conductor pattern layer and said at least one dielectric layer for facilitating intra-chip transfers of the data, address, and interrupt information signals to help improve interrupt processing transfer rates.

2. A microcircuit according to claim 1, wherein said APIC I/O unit includes:

a redirection table comprising entries specifying microprocessors to which received interrupts are directed; and an interface unit for sending interrupts to the bus and indicating microprocessors to which interrupts are addressed.

3. A microcircuit according to claim 2, wherein each APIC local unit includes: a decoding unit for decoding interrupts on the bus and accepting only interrupts corresponding to a respective microprocessor.

4. A microcircuit according to claim 1, wherein said substrate includes a plurality of dielectric layers; and the electrical conductors comprise conductive patterns formed between the dielectric layers.

5. A microcircuit according to claim 4, wherein the electrical conductors further comprise conductive patterns formed on a surface of the substrate on which the microprocessors are carried.

6. A structure according to claim 1, wherein the microprocessors are flip-chip mounted on the substrate.

7. A structure, comprising:

a substrate having at least one dielectric layer, at least one conductor pattern layer, and a plurality of integrated circuit interconnection electrical terminals formed on the substrate;

said electrical terminals having conductive pads for effecting electrical interconnection on said substrate;

a plurality of Advanced Programmable Interrupt Controller (APIC) local units for prioritizing and passing interrupts to individual ones of said plurality of terminals respectively;

an Advanced Programmable Interrupt Controller (APIC) Input/Output (I/O) unit for receiving and distributing interrupts to terminals to which the interrupts are addressed;

a plurality of non-multiplexed electrical conductors on the substrate for interconnecting the terminals, the local units and the I/O unit;

said plurality of terminals and said plurality of APIC local units having a one to one corresponding relationship for effecting the rapid processing of interrupt signals;

a synchronous bus for passing data transmission, clock and arbitration signals between said plurality of APIC local units and said APIC I/O unit;

wherein certain individual ones of said plurality of electrical terminals are coupled to individual ones of said plurality of APIC local units and said APIC I/O unit for helping to effect on chip electrical interconnections between said plurality of terminals, said plurality of APIC local units and said APIC I/O unit;

a plurality of electrical conductors carried by the substrate for electrically interconnecting on said substrate, said synchronous bus to individual ones of said plurality of electrical terminals coupled to said APIC local units and the electrical terminals coupled to said APIC I/O unit;

said terminals, said synchronous bus, said plurality of processor/local unit electrical conductor arrangements and said plurality of electrical conductors being formed on said substrate and between said at least One conductor pattern layer and said at least one dielectric layer for facilitating intra-chip transfers of the data, address, and interrupt information signals to help improve interrupt processing transfer rates.

8. A structure according to claim 7, wherein said APIC I/O unit includes:

a redirection table comprising entries specifying terminals to which received interrupts are directed; and an interface unit for sending interrupts to the bus and indicating terminals to which interrupts are addressed.

9. A structure according to claim 8, wherein each APIC local unit includes a decoding unit for decoding interrupts on the bus and accepting only interrupts corresponding to a respective terminal.

10. A structure according to claim 7, wherein the substrate comprises a plurality of dielectric layers; and the electrical conductors comprise conductive patterns formed between said dielectric layers.

11. A structure according to claim 10, wherein the electrical conductors further comprise conductive patterns formed on a surface of the substrate on which the terminals are formed.

12. A structure according to claim 7, wherein the substrate is constituted by an integrated circuit die.

13. A structure according to claim 12, wherein the terminals are constituted by integrated circuit dies.

14. A structure according to claim 11, further comprising:

a plurality of processors formed on said substrate; and the structure further comprises an integrated circuit die which bridges the processors.

15. A system including an electronic device having a Multi-Chip-Module (MCM) structure, comprising:

a substrate having at least one dielectric layer, at least one conductor pattern layer, and a plurality of integrated circuit interconnection terminals formed on the substrate, said terminals having conductive pads for effecting electrical interconnection on said substrate;

a plurality of Advanced Programmable Interrupt Controller (APIC) local units carried on said substrate for prioritizing and distributing interrupts to the terminals selectively;

an APIC Input/Output (I/O) unit for receiving and distributing interrupt signals to terminals to which the interrupts are addressed;

a plurality of non-multiplexed electrical conductors on the substrate for interconnecting the terminals, the local units and the I/O unit;

a synchronous bus for passing data transmission, clock and arbitration signals between said plurality of APIC local units and said APIC I/O unit;

wherein certain individual ones of said plurality of terminals are coupled to individual ones of said APIC local units and said APIC I/O unit for helping to effect on chip electrical interconnections between said plurality of terminals, said plurality of APIC local units and said APIC I/O unit;

a plurality of electrical conductors carried by the substrate for electrically interconnecting on said substrate said synchronous bus to individual ones of said plurality of terminals coupled to said APIC local units and the terminals coupled to said APIC I/O unit;

plurality of other electrical conductors for electrically interconnecting individual ones of said plurality of terminals coupled to said plurality of terminals and the individual ones of said plurality of electrical terminals coupled to said plurality of APIC local units; and said terminals, said synchronous bus, and said plurality of electrical conductors being formed on said substrate and between said at least one conductor pattern layer and said at least one dielectric layer for facilitating intra-chip transfers of the data, address, and interrupt information signals to help improve interrupt processing transfer rates.

16. A structure according to claim 15, wherein said APIC I/O unit includes:

a redirection table comprising entries specifying terminals to which received interrupts are directed; and an interface unit for sending interrupts to the bus and indicating terminals to which interrupts are addressed.

17. A structure according to claim 16, wherein each APIC local unit including a decoding unit for decoding interrupts on the bus and accepting only interrupts corresponding to a respective terminal.

18. A structure according to claim 15, wherein the substrate comprises a plurality of dielectric layers; and the electrical conductors comprise conductive patterns formed between said dielectric layers.

19. A structure according to claim 18, wherein the electrical conductors further comprise conductive patterns formed on a surface of the substrate on which the terminals are formed.

20. A structure according to claim 15, wherein the substrate is constituted by an integrated circuit die.

21. A structure according to claim 20, further comprising:

a plurality of processors; and wherein the processors are constituted by integrated circuit dies.

22. A structure according to claim 21, wherein the processors are flip-chip mounted on the substrate.

23. A structure according to claim 22, wherein the structure further comprises an integrated circuit die which bridges the processors.

24. A system according to claim 15, wherein the electronic device comprises a Box Level Product (BLP).

25. A system according to claim 15, wherein the electronic device comprises a board level product.

* * * * *